(No Model.)
E. P. WARNER.
CARBON HOLDER.
No. 482,820. Patented Sept. 20, 1892.
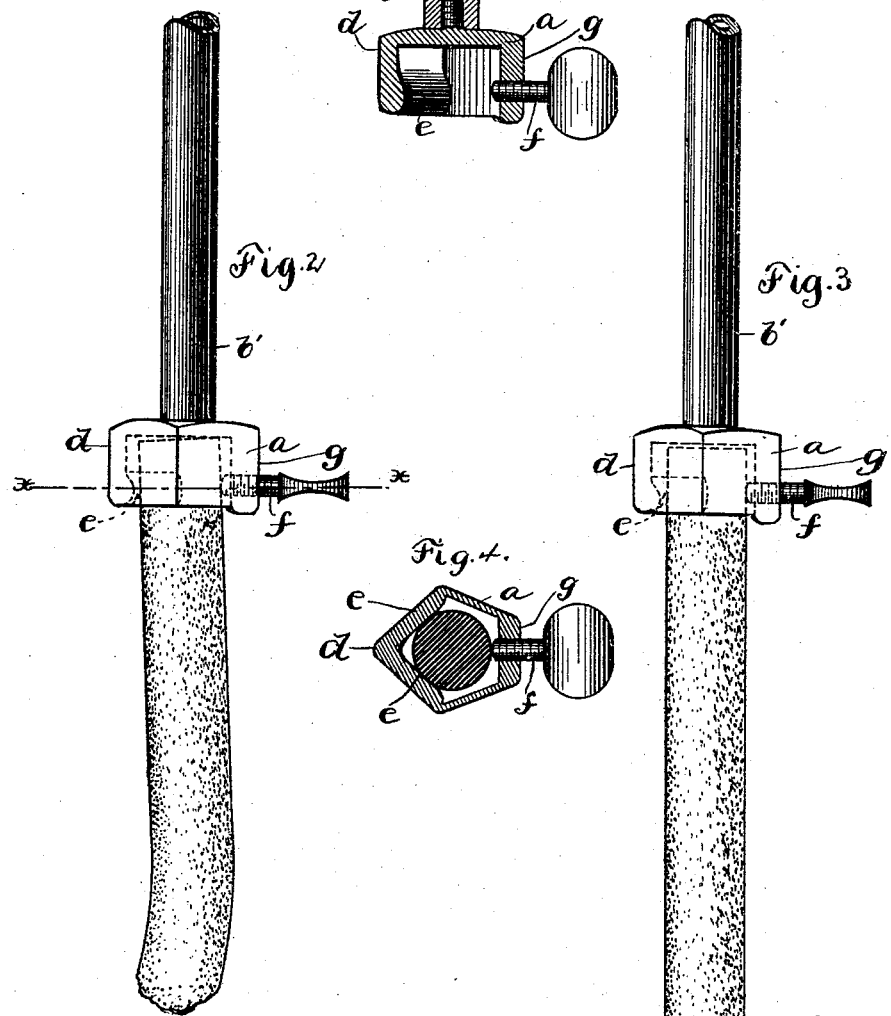
Witnesses:
G. L. Cragg
G. McMahon
Inventor:
Ernest P. Warner
By Barton & Brown
Attys

UNITED STATES PATENT OFFICE.

ERNEST P. WARNER, OF CHICAGO, ILLINOIS, ASSIGNOR TO THE WESTERN ELECTRIC COMPANY, OF SAME PLACE.

CARBON-HOLDER.

SPECIFICATION forming part of Letters Patent No. 482,820, dated September 20, 1892.

Application filed April 21, 1892. Serial No. 430,087. (No model.)

*To all whom it may concern:*

Be it known that I, ERNEST P. WARNER, a citizen of the United States, residing at Chicago, in the county of Cook and State of Illinois, have invented a certain new and useful Improvement in Carbon-Holders, (Case No. 48,) of which the following is a full, clear, concise, and exact description, reference being had to the accompanying drawings, forming a part of this specification.

My invention relates to carbon-clamps; and its object is to permit the ready adjustment of the two carbons of a pair in alignment when said carbons are not exactly straight and to hold the carbon in its place when once adjusted. Hitherto in order to secure this alignment with the ordinary clamp the carbons themselves required to be very straight. To accomplish the purpose of my invention, universal joints have been used connecting the carbon-clamp with the carbon-rod and permitting a free motion of the carbon to secure its alignment.

In my invention the objectionable feature of the universal joint is avoided, but the same result is secured, and by the use of my invention carbons which have been hitherto necessarily discarded on account of their crookedness may be satisfactorily used.

My invention will be more readily understood by reference to the accompanying drawings, in which—

Figure 1 shows the clamp of my invention in section with a part of the carbon-rod to which it is attached, partly in section to reveal the manner of uniting said clamp therewith. Fig. 2 is a view of the clamp with the carbon held in a position slightly out of the vertical. Fig. 3 is a view showing the carbon in a vertical position. Fig. 4 is a view on line $x$ $x$ of Fig. 1.

Similar letters refer to similar parts throughout the different views.

The carbon-clamp $a$ I make preferably of a pentangular shape in plan and in one solid piece. This clamp is attached to the solid portion $b$ of the carbon-rod $b'$ by means of screw $c$, which is preferably cast solid with the clamp. Other means might be employed for fastening the clamp to the carbon-rod. Upon each of the two sides coming together at the angle $d$ I provide lips $e$ $e$, which present convex surfaces to the carbon which is to be held. These lips, in conjunction with the thumb-screw $f$, hold the carbon in place. This screw is so placed in the clamp that its axis may be in a plane preferably coincident with the highest points of the convex surfaces of the lips $e$ $e$ and is mounted in side $g$ opposite angle $d$.

By reference to Fig. 4 it will be seen that the carbon is held in engagement by the lips $e$ $e$ and the screw $f$, thus forming but three points of contact. The recess above the lips $e$ $e$ and screw $f$ is of sufficient size to allow the carbon to be moved freely in any direction sufficiently to permit its alignment with the lower carbon, as shown in Fig. 2.

While the ceiling of the recess above the contact-lips is not essential to hold the carbon in a canting position, the upper end of the carbon may rest against said ceiling and by frictional contact therewith be assisted in maintaining said canting position.

By the use of my clamp the carbon may be held securely in any position in which it is capable of being put. The alignment of the carbons is thus facilitated, and that straightness hitherto required in the manufacture of carbons is not needed.

These clamps may be used in connection with both of a pair of carbons or with either the lower or upper carbon.

I do not wish to confine myself to the precise shape or construction shown, as the principle which I employ may be embodied in devices differing in mechanical construction.

Having thus described my invention, what I claim as new, and desire to secure by Letters Patent, is—

1. A carbon-clamp $a$, provided with the lips $e$ $e$ upon its inner surface, said lips being provided with contact-surfaces running in a horizontal direction, and a thumb-screw $f$, whereby the carbon held by said clamp may be aligned with the other member of a pair of carbons, substantially as specified.

2. A carbon-clamp of angular cross-section adapted to give three points of contact to the carbon, two of said contact-points being provided upon lips running in a horizontal direction, and to permit a swinging motion of said carbon in any direction, whereby the point of said carbon is brought in alignment with the other carbon of the pair and secured in that position, substantially as described.

3. In a carbon-clamp, the combination, with three points of contact for the carbon, of a recess above said contact-points, whereby a swinging motion of said carbon in any direction is permitted, substantially as described.

4. In a carbon-clamp, the combination, with three points of contact approximately in the same plane, of a recess above said contact-points, provided with a ceiling against which the carbon may rest.

In witness whereof I hereunto subscribe my name this 26th day of March, A. D. 1892.

ERNEST P. WARNER.

Witnesses:
M. JEANE TALLETT,
G. L. CRAGG.